US011405833B2

(12) United States Patent
Yiu et al.

(10) Patent No.: US 11,405,833 B2
(45) Date of Patent: Aug. 2, 2022

(54) TECHNIQUES TO PERFORM A RANDOM-ACCESS CHANNEL PROCEDURE FOR HANDOVERS IN A WIRELESS COMMUNICATION ENVIRONMENT

(71) Applicant: Apple Inc., Cupertino, CA (US)

(72) Inventors: Candy Yiu, Portland, OR (US); Kyeongin Jeong, Portland, OR (US); Ansab Ali, Hillsboro, OR (US); Dae Won Lee, Portland, OR (US); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 16/464,768

(22) PCT Filed: Aug. 8, 2018

(86) PCT No.: PCT/US2018/045880
§ 371 (c)(1),
(2) Date: May 29, 2019

(87) PCT Pub. No.: WO2019/032754
PCT Pub. Date: Feb. 14, 2019

(65) Prior Publication Data
US 2019/0313300 A1    Oct. 10, 2019

Related U.S. Application Data

(60) Provisional application No. 62/543,868, filed on Aug. 10, 2017.

(51) Int. Cl.
*H04W 36/00* (2009.01)
*H04B 17/318* (2015.01)
(Continued)

(52) U.S. Cl.
CPC ...... *H04W 36/0077* (2013.01); *H04B 17/318* (2015.01); *H04B 17/336* (2015.01);
(Continued)

(58) Field of Classification Search
CPC ... H04B 17/318; H04B 17/336; H04L 1/0026; H04L 5/0051; H04W 24/10;
(Continued)

(56) References Cited

U.S. PATENT DOCUMENTS

2007/0293224 A1    12/2007  Wang et al.
2009/0303965 A1 *  12/2009  Yokoyama ............ H04W 56/00
                                                370/331
(Continued)

FOREIGN PATENT DOCUMENTS

EP          2530972 A1     12/2012
WO       2016043502 A1      3/2016
WO       2016085235 A1      6/2016

OTHER PUBLICATIONS

International Search Report for the International Patent Application No. PCT/US2018/045880, dated Nov. 20, 2018, 11 pages.
(Continued)

*Primary Examiner* — Omar J Ghowrwal
(74) *Attorney, Agent, or Firm* — Eschweiler & Potashnik, LLC

(57) ABSTRACT

Embodiments may be directed to techniques to process a handover command message received from a source next generation node B (gNB), the handover command message comprising random-access channel (RACH) configuration information and determine at least one of dedicated RACH resources and common RACH resources to access a target gNB based on the RACH configuration information. Embodiments also include techniques to cause, via an interface, one or more attempts to access the target gNB utilizing
(Continued)

at least one of the dedicated RACH resources and the common RACH resources.

21 Claims, 10 Drawing Sheets

(51) Int. Cl.
| | |
|---|---|
| *H04B 17/336* | (2015.01) |
| *H04L 1/00* | (2006.01) |
| *H04L 5/00* | (2006.01) |
| *H04W 24/10* | (2009.01) |
| *H04W 36/08* | (2009.01) |
| *H04W 56/00* | (2009.01) |
| *H04W 74/08* | (2009.01) |
| *H04W 74/00* | (2009.01) |

(52) U.S. Cl.
CPC .......... *H04L 1/0026* (2013.01); *H04L 5/0051* (2013.01); *H04W 24/10* (2013.01); *H04W 36/08* (2013.01); *H04W 56/001* (2013.01); *H04W 74/0833* (2013.01); *H04W 74/0891* (2013.01); *H04W 74/006* (2013.01); *H04W 74/0866* (2013.01)

(58) Field of Classification Search
CPC ............. H04W 36/0077; H04W 36/08; H04W 56/001; H04W 74/006; H04W 74/0833; H04W 74/0866; H04W 74/0891
USPC ......................................................... 370/331
See application file for complete search history.

(56) References Cited

U.S. PATENT DOCUMENTS

| | | |
|---|---|---|
| 2010/0222066 A1 | 9/2010 | Du et al. |
| 2015/0036664 A1 | 2/2015 | Yuk et al. |
| 2015/0304894 A1 | 10/2015 | Bufe et al. |
| 2017/0347313 A1* | 11/2017 | Arora ................... H04W 52/028 |
| 2018/0115940 A1* | 4/2018 | Abedini .............. H04L 27/2655 |
| 2018/0324853 A1* | 11/2018 | Jeon ...................... H04W 74/08 |
| 2019/0349819 A1* | 11/2019 | Xu ....................... H04B 7/0695 |

OTHER PUBLICATIONS

Supplementary European Search Report dated Mar. 16, 2021 in connection with EP Patent Application EP 18 84 4321.

Huawei, et al.; "Text Proposal to TS 38.300 on Baseline Handover Procedure for Inter gNB Handover in NR"; 3GPP Draft; R2-1707485 Text Proposal on Baseline Handover Procedure for Inter GNB Handover in NR, 3rd Generation Partnership Project (3GPP), Mobile Competency Centre; 650, Route Des Lucioles; F-0692, vol. Ran WG2, Jun. 29, 2017.

Huawei, et al.; "Baseline Handover Procedure for Inter gNB Handover in NR"; 3GPP Draft; R2-1706705 Baseline Handover Procedure for Inter GNB Handover in NR, 3rd Generation Partnership Project (3GPP), Mobile Competency Centre; 650, Route Des Lucioles, F-06921 Sophia-Antipoli, vol. Ran WG2, No. Qingdao, China; Jun. 26, 2017.

Ericsson: "Further Details of Handover Execution in NR"; 3GPP Draft; R2-1702672—Further Details of Ho Execution in NR, 3rd Generation Partnership Project (3GPP), Mobile Competence Centre; 650, Route Des Lucioles, F-06921 Sophia-Antipolis Cedex; vol. RAN WG2, Apr. 3, 2017.

Intel Corporation, "Random Access Procedure in NR"; 3GPP Draft; R2-1708783, 3rd Generation Partnership Project (3GPP), Mobile Competence Centre; 650, Route Des Lucioles, F-06921 Sophia-Antipolis Cedex; France, vol. RAN WG2, Aug. 20, 2017.

* cited by examiner

400

PROCESS A HANDOVER COMMAND MESSAGE RECEIVED FROM A SOURCE NEXT GENERATION NODE B (GNB), THE HANDOVER COMMAND MESSAGE COMPRISING RANDOM-ACCESS CHANNEL (RACH) CONFIGURATION INFORMATION
405

DETERMINE AT LEAST ONE OF DEDICATED RACH RESOURCES AND COMMON RACH RESOURCES TO ACCESS A TARGET GNB BASED ON THE RACH CONFIGURATION INFORMATION
410

CAUSE, VIA THE RADIO RESOURCES, ONE OR MORE ATTEMPTS TO ACCESS THE TARGET GNB UTILIZING AT LEAST ONE OF THE DEDICATED RACH RESOURCES AND THE COMMON RACH RESOURCES
415

FIG. 4

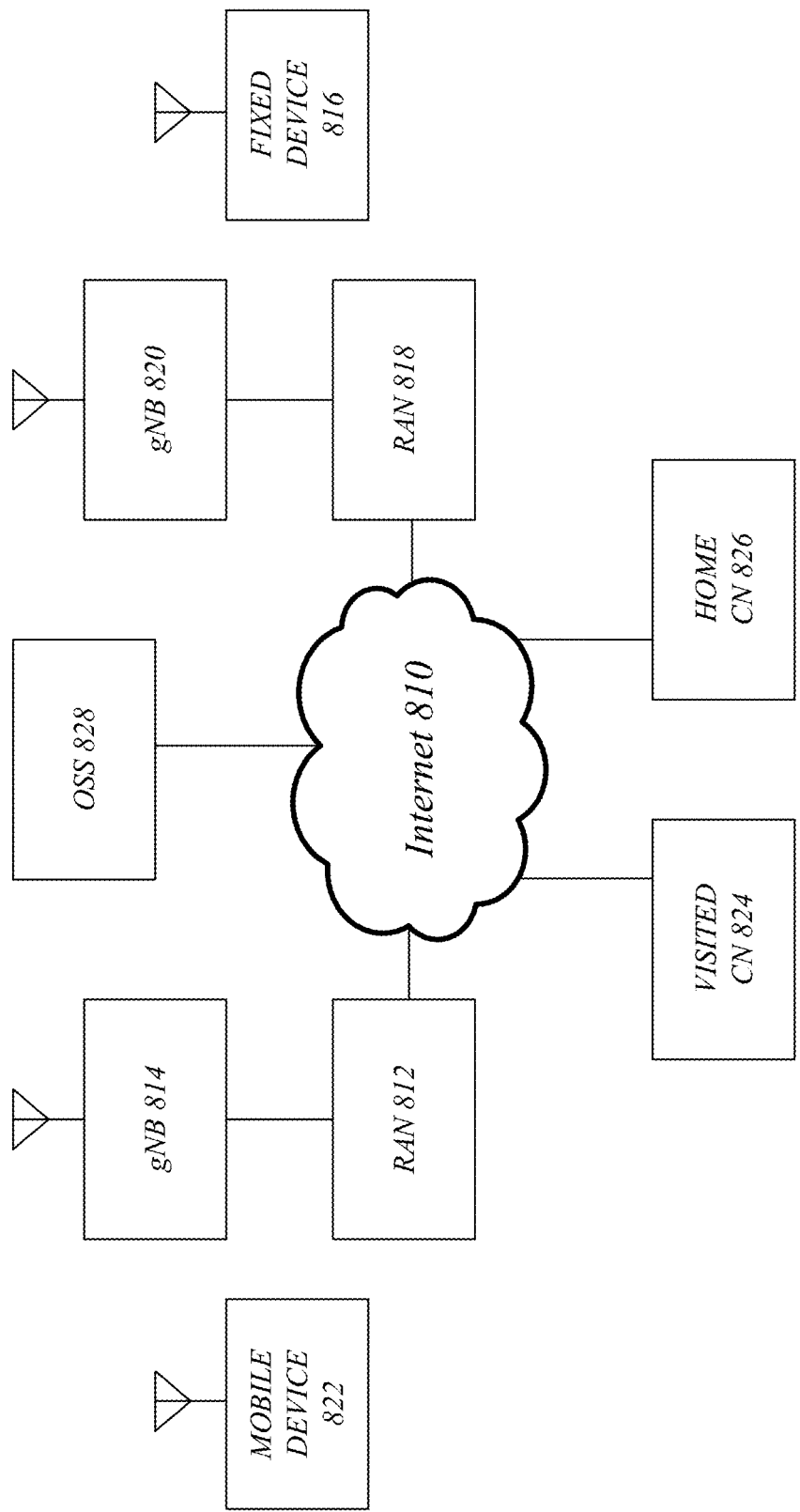

TECHNIQUES TO PERFORM A RANDOM-ACCESS CHANNEL PROCEDURE FOR HANDOVERS IN A WIRELESS COMMUNICATION ENVIRONMENT

CROSS-REFERENCE TO RELATED APPLICATIONS

This application is a national phase claiming the benefit of and priority to International Patent Application No. PCT/US2018/045880, entitled "TECHNIQUES TO PERFORM A RANDOM-ACCESS CHANNEL PROCEDURE FOR HANDOVERS IN A WIRELESS COMMUNICATION ENVIRONMENT", filed Aug. 8, 2018, which claims priority to previously filed U.S. provisional patent application Ser. No. 62/543,868, filed Aug. 10, 2017, which are hereby incorporated by reference in their entireties.

TECHNICAL FIELD

Embodiments are generally directed to performing handover operations in wireless cellular networks.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometimes conflicting performance dimensions and services. Such diverse multi-dimensional requirements are driven by different services and applications. In general, NR will evolve based on 3GPP (Long-Term Evolution) LTE-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE DRAWINGS

FIG. 4 illustrates an example of a fourth logic flow diagram.

FIG. 8 illustrates an example of a broadband wireless access system.

DETAILED DESCRIPTION

Figure 1:
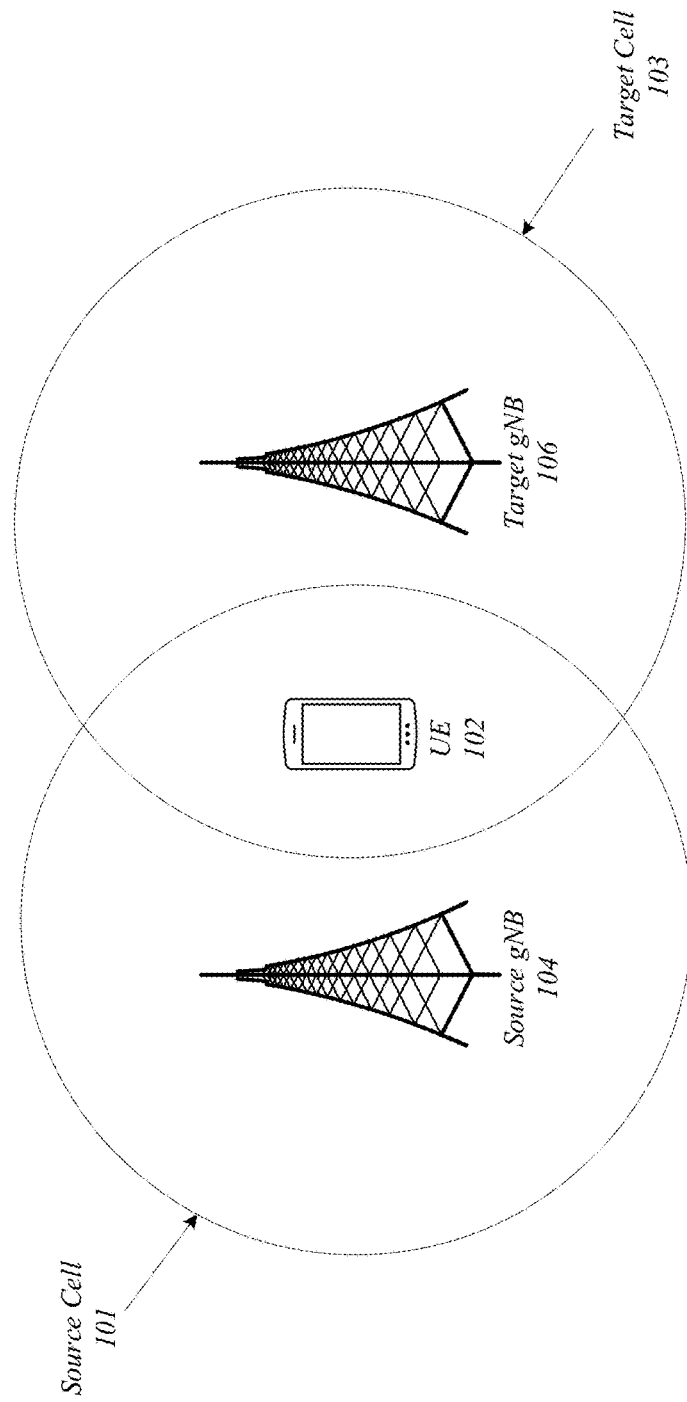
FIG. 1 illustrates an example of a system.

Embodiments discussed herein may be general related performing handover operations in wireless cellular networks. These operations may include a handover for user equipment (UE) from a source next-generation node B (gNB) to a target gNB. Embodiments include communicating messages and processing the messages, information, and data communicated between a UE, a source gNB and a target gNB to perform the handover.

In one example, the UE may process a handover command message received from a source gNB. The handover command message may include random-access channel (RACH) configuration information that may be used by the UE to make one or more decisions to perform a RACH procedure with the target gNB and complete the handover. Moreover, and in some instances, the handover command message may be received from a source gNB in response to communication of a measurement report message communicated to the source gNB by the UE.

In embodiments, the RACH configuration information indicates one or more of dedicated RACH resources and common RACH resources to access the target gNB. The RACH configuration information specifies one or more sets of RACH resources (dedicated RACH resources and common RACH resources) that may be used by the UE to attempt to access the target gNB as part of the RACH procedure, for example. The UE may cause, via radio resources, one or more attempts to access the target gNB utilizing the RACH resources based on the RACH configuration information. In instances, the UE may attempt to access the target gNB using the dedicated RACH resources prior to attempting to access the target gNB utilizing the common RACH resources, e.g., the dedicated RACH resources may be prioritized over the common RACH resources. However, if the one or more attempts to access the target gNB via the dedicated RACH resources fail, the UE may attempt to access the target gNB via the common RACH resources. In another example, the UE may utilize the common RACH resources to perform the RACH procedure when an indication of the common RACH resources is received first in time, e.g., prior to the indication of the dedicated RACH resources. Similarly, only common RACH resources may be indicated in the RACH configuration information and utilized to perform the RACH procedure. Embodiments are not limited to this example, and additional details are discussed herein.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a system 100 for cellular communication in accordance with some embodiments discussed herein. A base station, such as a next-generation node B (gNB) 104 supporting the 5G New Radio, provides wireless communication services to communication devices, such as user equipment (UE) 102, within cell 101. A base station, such as gNB 106, provides wireless communication services to communication devices within cell 103. A handover may be performed from gNB 104 to gNB 106 to handover communications with the UE 102 when certain handover criterion are met.

In accordance with embodiments, handover initiation parameters may include a measurement event to trigger measurement reporting, e.g., sending a measurement report adaptively selected for performing a handover from a source cell, such as cell 101, to a target cell, such as cell 103.

In these embodiments, a handover from the serving cell 101 to the target cell 103 may be initiated when the target cell reference signal received power (RSRP) continuously exceeds the serving cell RSRP by at least an offset value. The offset value may be selected to be inversely related to the target cell RSRP.

Figure 2:
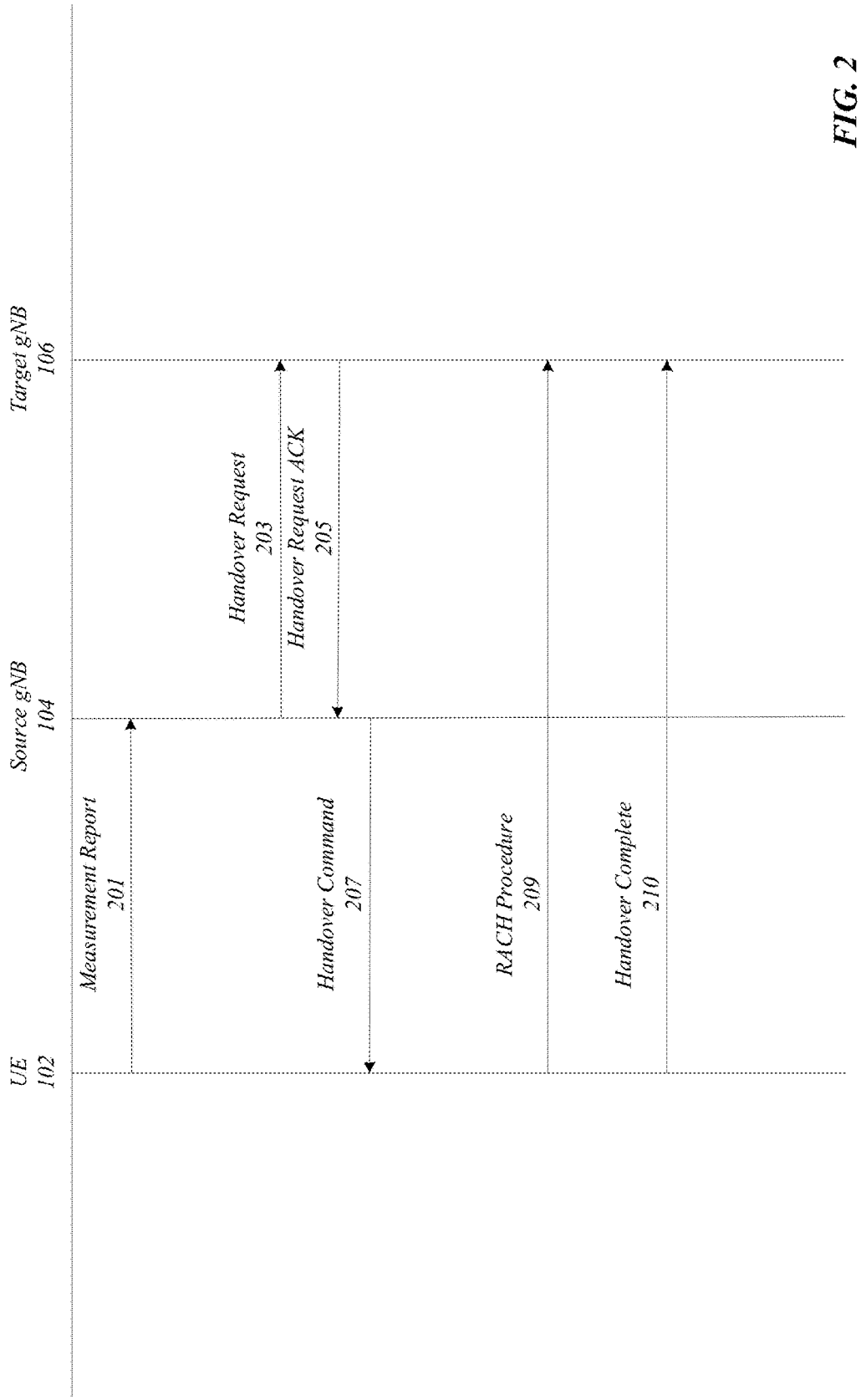
FIG. 2 illustrates an example of message communication in a system.

FIG. 2 illustrates a handover procedure 200, in accordance with various embodiments. The handover procedure 200 may occur between a source gNB 104 and a target gNB 106 for a UE 102. At 201, the UE 102 may send a measurement report to the source gNB 104. The measurement report may be sent by the UE 102 in response to triggering of a measurement event or upon expiration of the time to trigger timer by an event or periodically, for example. The measurement report may include information about surrounding cells reference signal measurements, e.g., reference signal received power (RSRP), reference signal received quality (RSRQ) or signal-to-interface plus noise ratio (SINR), a measurement configuration, and a beam measurement. The source gNB 104 may make a handover decision based on the measurement report. In the example of FIG. 2, the decision is made to initiate a handover of the connection of the UE 102 to target gNB 106.

At 203, the source gNB 104 may send an HO request to the target gNB 106 and, in response, receive an HO request ACK at 205. The ACK may include mobility information relating to the target gNB 106 for use by the UE 102, and the HO request may include a UE context for the UE 102. The HO request may include measurement information received from the UE 102, including beam measurement when beams are presenting the network.

At 207, the source gNB 104 may send a handover command to the UE 102. Further, the HO command may include RACH configuration information, parameters, and mobility information received from the target gNB 106. For example, the HO command includes information or parameters, such as a cell radio network temporary identifier (C-RNTI) for the target gNB 106 and a security algorithm for the target gNB 106. The HO command may specify additional information including an association between the RACH resources and sync sequence (SS) blocks and an association between the RACH resources and channel state information reference signal (CSI-RI). The HO command may also specify RACH configuration information including specifying one or more sets of RACH resources that may be used by the UE 102 to attempt to access the target gNB 106 as part of the RACH procedure. For example, the HO command may specify a set of dedicated RACH resources in an information element (IE) of the HO command and a set of common RACH resources in another IE of the HO command that may be utilized for the RACH procedure. In another example, the dedicated and common RACH resources may be specified in the same IE of the HO command.

At line 209, the UE 102 and the target gNB 106 may perform the RACH procedure based on the information of the HO command. In performing the RACH procedure, the UE 102 may make a number of determinations. For example, the UE 102 may select specified RACH resources and beams to perform the RACH procedure. The UE 102 may also determine whether to perform a contention-based or contention-free RACH procedure based on the RACH configuration in the HO command and/or whether the RACH configuration is included in the HO command. For example, if the UE 102 receives an HO command that does not specify the RACH configuration information, a contention-based RACH procedure is performed. If the UE 102 receives an HO command that does specify the RACH configuration and includes only common RACH resources, the UE 102 may perform either a contention-free RACH procedure or a contention-based RACH procedure. Further, if the UE 102 receives an HO command that specifies the RACH configuration information including dedicated RACH resources, a contention-free RACH procedure may be performed.

Further, the RACH configuration information may also include beam information indicating beams to use for the RACH procedure, and in some instances, an order of the beams. In performing the RACH procedure, the UE 102 may select a suitable beam from all beams of the target cell, based on the beam information and a configuration at the UE 102 and perform the RACH procedure. One or more suitable beams may include beams capable of supporting communication above a configured threshold, e.g., an RSSI or SINR value. In some instances, the beam information may indicate an order of beams, and the UE 102 may select the beams based on the order indicated in the beam information. Embodiments are not limited in this manner.

In embodiments, the UE 102 may make other decisions to perform the RACH procedure and handover based on the RACH configuration information in the HO command. For example, if the network, e.g., a gNB node or core network element, configures only dedicated RACH resources or common RACH resources, then the UE 102 can use whichever configured RACH resources to access the target cell and the target gNB 106.

In embodiments, the UE 102 may determine a configuration on how to utilize a set of dedicated RACH resources and a set of common RACH resources when they are both specified (allocated) in the HO command In one example, the UE 102 prioritizes the dedicated RACH resources over the common RACH resources. The UE 102 may first try one or more attempts to access and perform the RACH procedure with the target gNB 106 via the dedicated RACH resources. However, if those attempts fail, the UE 102 may try to attempt to access and perform the RACH procedure using common RACH resources.

In embodiments, the UE 102 may determine whether the attempt to access using the dedicated RACH resources failed based on one or more criterion. For example, the UE 102 may attempt to access the gNB 106 using the dedicated RACH resources until there are no suitable beams available, e.g., no beams provide communication capabilities above an RSSI threshold. In another example, the UE 102 may determine that the attempts to access the gNB 106 utilizing the dedicated RACH resources failed based on a number of attempts exceeding an attempt threshold value, e.g., a specified number of attempts. In embodiments, the attempt threshold value may be predetermined by the UE 102, provided in the HO command, set based on one or more specifications, based on channel conditions, and so forth. In a third example, the UE 102 may detect an expiration of a timer to determine the one or more attempts to access the target gNB 106 via the dedicated RACH resources failed. In a fourth example, the UE 102 may detect an end of the dedicated RACH resources to determine the one or more attempts to access the target gNB 106 via the dedicated RACH resources failed, e.g., each attempt on each of the dedicated RACH resources failed.

In some instances, the UE 102 may determine which RACH resources, e.g., dedicated or common RACH resources, to use first to perform the RACH procedure by other means. For example, the UE 102 can use either dedicated RACH resources or common RACH resource whichever comes first in time to reduce interruption time.

The UE 102 may identify the dedicated and common RACH resources specified in the HO command based on information in IE elements. More specifically, the HO command may include an IE element specifying the dedicated RACH resources and another IE element specifying the common RACH resources. However, in another example, an IE element of the HO command may specify both the dedicated and common RACH resources and the UE 102 may not need to distinguish them apart from each other.

Figure 3A:
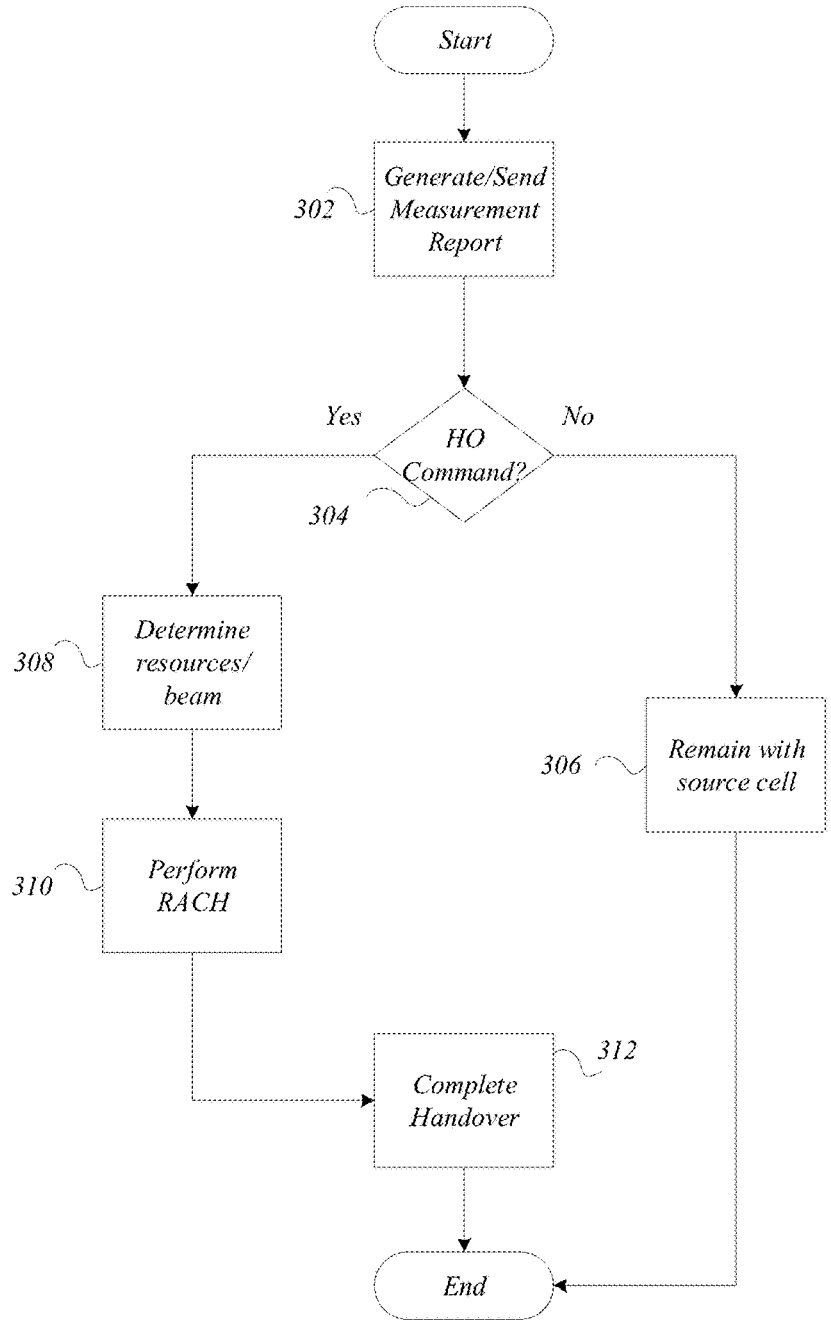
FIG. 3A illustrates an example of a first logic flow diagram of operations performed a UE for a handover.

FIG. 3A illustrates an example of a logic flow 300 that may be representative of some or all of the operations executed by one or more embodiments described herein. For example, the logic flow 300 may illustrate operations performed by a system including a UE to perform a handover, as described herein.

At block 302, a UE may generate and send a measurement report to the source gNB based on a measurement configuration, such as a triggering condition or periodic reporting setting. The measurement report may include information about surrounding cells measured RSRP, RSRQ or SINR, and beam measurement based on the configuration of the UE. The source gNB may make a handover decision based on the measurement report. In response to making the handover decision to handover to a target cell and target gNB, the source gNB may send an HO command to the UE. If the source cell and source gNB determines not to handover to a target cell and gNB, the source gNB forgoes sending an HO command.

At block 304, the UE may determine whether it received the HO command or not. If UE determines that an HO command has not been received, the UE determines to remain with the current source cell, and source gNB and a handover operation is not performed at block 306. The UE may determine that an HO command was received at block 304 and initiate a RACH procedure and make a number of determinations at block 308.

At block 308, the UE may determine a number of configurations for the RACH and handover procedures. For example, the UE may select RACH resources and beams and determine whether to perform a contention-based or contention-free RACH procedure, as previously discussed. These determinations may be based on configuration settings at the UE, environmental issues, and information received in the HO command, e.g., RACH configuration information. For example, the HO command may include RACH configuration information, e.g., specifying dedicated and/or common RACH resources for the RACH procedure which may be used to determine whether to perform a contention-based or contention-free RACH procedure. The RACH configuration information may also include beam information indicating beams to utilize during the RACH procedure and, in some instances, an order of the beams. At block 310, the UE may perform a RACH procedure with the selected target gNB, RACH resources, and beams based on the determinations made by the UE. Further and at block 312, the UE may complete the handover, and the process may end.

Figure 3B:
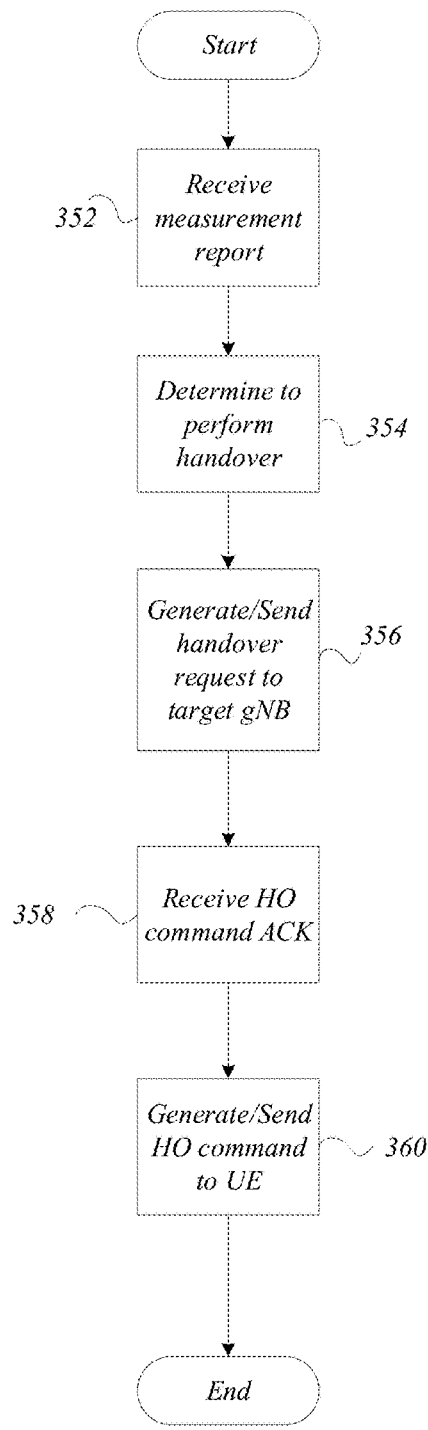
FIG. 3B illustrates an example of a second logic flow diagram of operations performed by a source gNB.

FIG. 3B illustrates an example of a logic flow 350 that may be representative of some or all of the operations executed by one or more embodiments described herein. For example, the logic flow 350 may illustrate operations performed by a system including a source gNB to perform a handover, as described herein.

In embodiments, a gNB may receive a measurement report from a UE at block 352. The measurement report may include information regarding the wireless connection between the UE and the gNB providing cell services to the UE. For example, the measurement report may include information about surrounding cells measurements in RSRP, RSRQ or SINR based on a measurement configuration of the UE, and beam measurement if configured at the UE. At block 354, the gNB may determine that a handover of the connection should be performed to a different gNB. The gNB may determine to initiate the handover based on the information in the measurement report, e.g., the gNB determines that one or more other gNBs will provide better service and quality wireless connection.

At block 356, the gNB may generate and transmit an HO request to a target gNB. As discussed above, in various embodiments, this HO request may include the context for the UE. The HO request may also include measurement information received from the UE, including beam measurement when beams are presenting the network. At block 358, the source gNB may receive an HO ACK from the target gNB. In various embodiments, the transmission of the HO request and receipt of the ACK may be done via a wired network connecting the source gNB and target gNB rather than via the RF. However, embodiments are not limited in this manner.

At block 360, the source gNB may generate and transmit an HO command to the UE. In various embodiments, the HO command may include RACH configuration information. The UE may utilize information in the HO command to perform the RACH procedure with the target gNB and complete the handover, as discussed in flow 300.

Figure 3C:
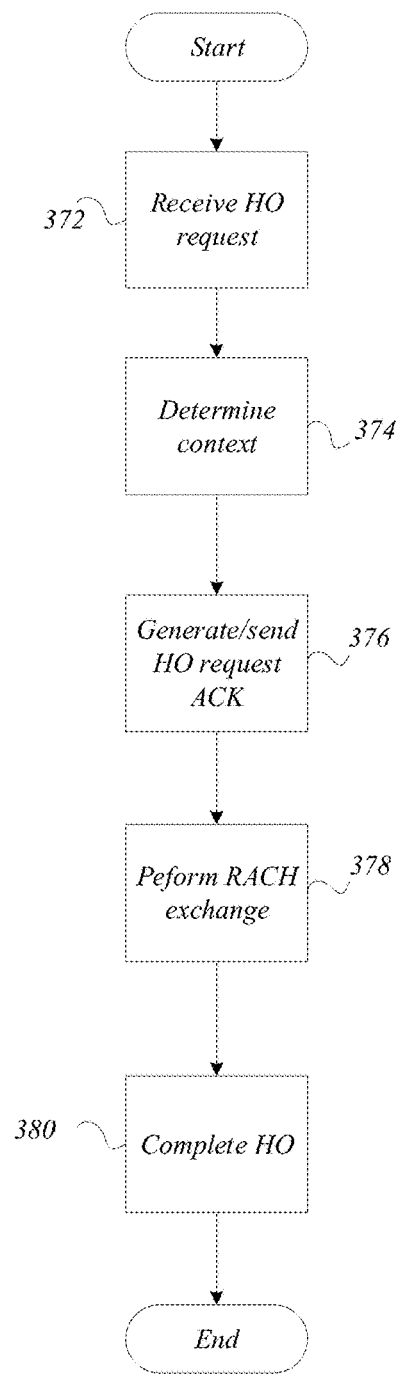
FIG. 3C illustrates an example of a third logic flow diagram of operations performed by a target gNB.

FIG. 3C illustrates an example of a logic flow 370 that may be representative of some or all of the operations executed by one or more embodiments described herein. For example, the logic flow 370 may illustrate operations performed by a system including a target gNB to perform a handover, as described herein.

At block 372, a target gNB may receive an HO request from the source gNB. In embodiments, the HO request may be based and generated in response to a measurement report sent to the source gNB from the UE. In some embodiments, the HO request may include a context for the UE. Thus, the target gNB may determine the context from the HO request at block 374. In other instances, the HO request may not include the context, and the target gNB may determine/retrieve the context from source gNB or an anchor device at block 374. In response, at block 376, the target gNB may generate a handover request ACK and transmit the ACK to the source gNB. At block 378, the target gNB may send a response RAR when in response to the target gNB receiving the RACH from the UE. Further, the target gNB may complete the HO with the UE at block 380.

FIG. 4A illustrates an example of a logic flow 400 that may be representative of some or all of the operations executed by one or more embodiments described herein. For example, the logic flow 400 may illustrate operations performed by a system including a UE to perform handover, as described herein.

At block 405, the logic flow 400 may include processing a handover command message received from a source next-generation node B (gNB), the handover command message including random-access channel (RACH) configuration information. The handover command message may be received from a source gNB in response to communication of a measurement report message communicated to the source gNB by the UE.

Further and at block 410, the logic flow 400 includes determining at least one of dedicated RACH resources and common RACH resources to access a target gNB based on the RACH configuration information. In embodiments, the RACH configuration information specifies one or more sets of RACH resources (dedicated RACH resources and/or common RACH resources) that may be used by the UE to attempt to access the target gNB as part of the RACH procedure. The RACH configuration information may also include beam information specifying one or more beams and order of at least some of the specified beams that may be used to perform the RACH procedure. A UE may use the RACH configuration information including the beam information to perform the RACH procedure including determining which RACH resources to utilize, whether to perform contention-based or contention-based RACH procedure, determining beams, and an order of the beams, for example.

At block 415, the logic flow includes causing, via the radio resources, one or more attempts to access the target gNB utilizing at least one of the dedicated RACH resources and the common RACH resources. In some instances, the UE may attempt to perform the RACH procedure utilizing dedicated RACH resources first, having priority over the common RACH resources. In these instances, the UE may attempt to perform until a failure determination is made, e.g., no suitable beams for the dedicated RACH resources, a number of attempts threshold is reached, and a timer expired. If the attempt to perform the RACH procedure using the dedicated RACH resources fails, the UE may attempt to the RACH procedure using the common RACH resources. Embodiments are not limited in this manner. For example, and in other instances, the UE may first attempt to perform the RACH procedure using common RACH resources when an indication of common RACH resources is received first in time, e.g., before the indication of the dedicated RACH resources from the gNB.

Figure 5:
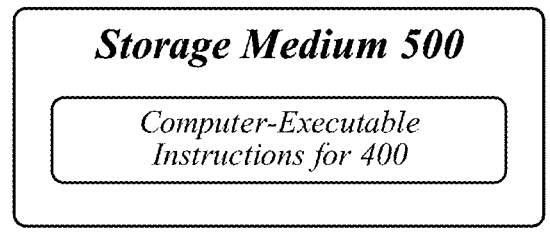
FIG. 5 illustrates an example of a storage medium.

FIG. 5 illustrates an embodiment of a storage medium 500. Storage medium 500 may include any non-transitory computer-readable storage medium or machine-readable storage medium, such as an optical, magnetic or semiconductor storage medium. In various embodiments, storage medium 500 may include an article of manufacture. In some embodiments, storage medium 500 may store computer-executable instructions, such as computer-executable instructions to implement one or more of embodiments discussed herein, such as logic flow 400. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 6:
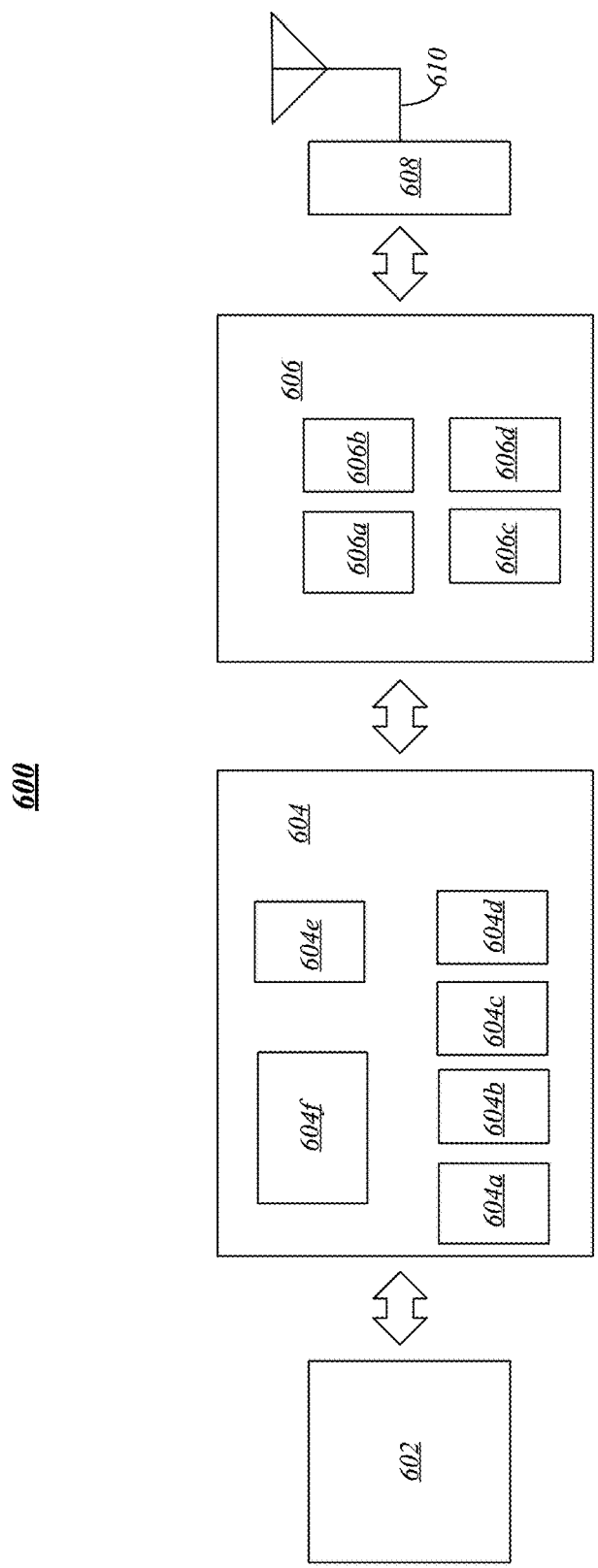
FIG. 6 illustrates an example of a UE device.

FIG. 6 illustrates an example of a UE device 600 that may be representative of a UE that implements one or more of the disclosed techniques in various embodiments. In some embodiments, the UE device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a second generation (2G) baseband processor 604a, third-generation (3G) baseband processor 604b, fourth generation (4G) baseband processor 604c, fifth generation (5G or NR) baseband processor 604d, and/or other baseband processor(s) for other existing generations, generations in development or to be developed in the future (e.g., sixth generation 6G, etc.). The baseband circuitry 604 (e.g., one or more of baseband processors 604a-d) may handle various radio control functions that enable communication with one or more radio networks via the RF circuitry 606. The radio control functions may include but are not limited to, signal modulation/demodulation, encoding/decoding, radio frequency shifting, etc. In some embodiments, the modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals, and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may include passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include an analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer including a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage-controlled oscillator (VCO), although that is not a requirement. Divider control input may be provided by either the baseband circuitry 604 or the application circuitry 602 depending on the desired output frequency. In some embodiments, a divider control input (e.g., N) may be determined from a look-up table based on a channel indicated by the application circuitry 602.

Synthesizer circuitry 606d of the RF circuitry 606 may include a divider, a delay-locked loop (DLL), a multiplexer and a phase accumulator. In some embodiments, the divider may be a dual modulus divider (DMD), and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some embodiments, the UE device 600 may include additional elements such as, for example, memory/storage, display, camera, sensor, and/or input/output (I/O) interface.

Figure 7:
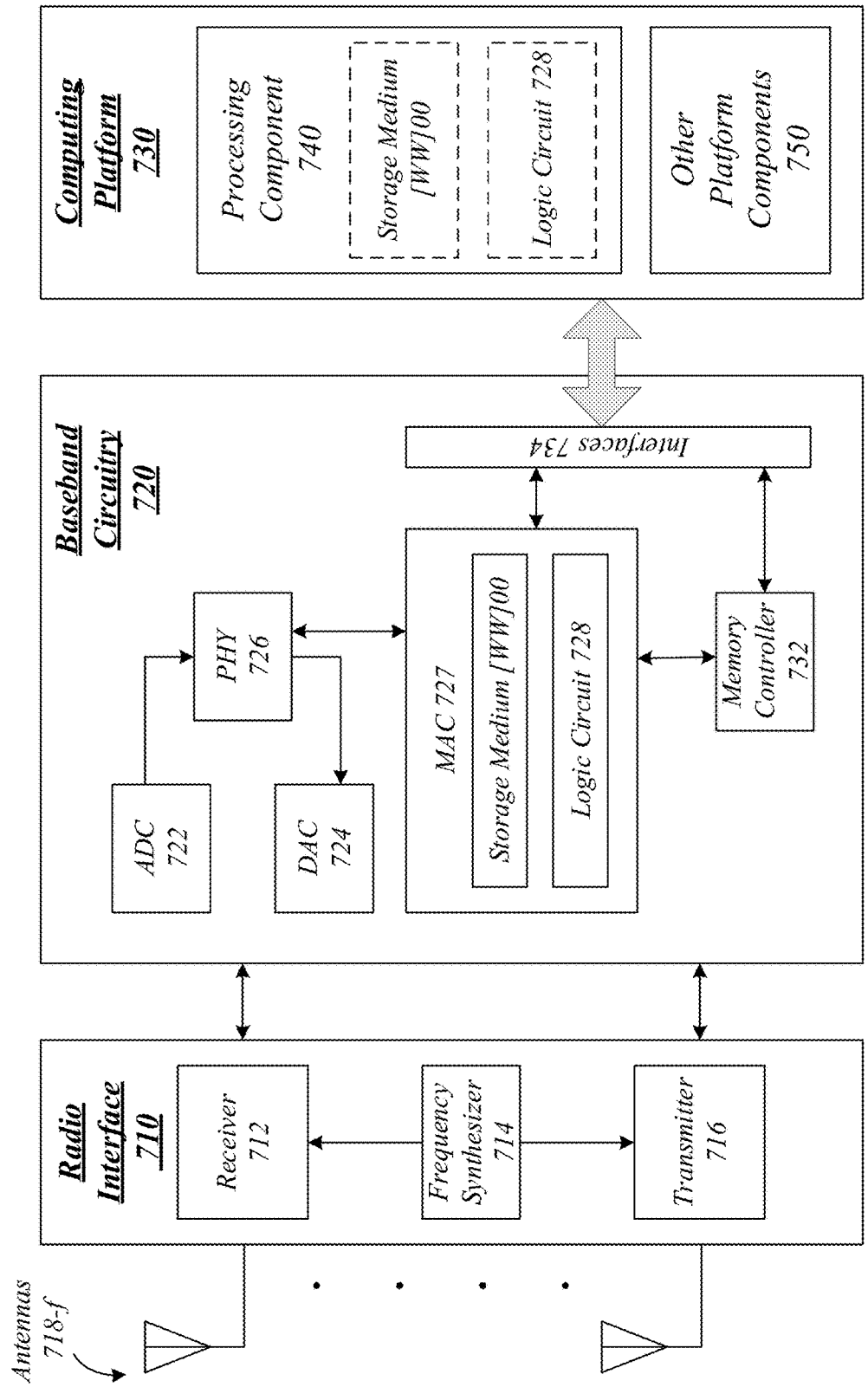
FIG. 7 illustrates an example of a device.

FIG. 7 illustrates an embodiment of a communications device 700 that may implement one or more of UE 102, logic flows 300 and 400, storage medium 500, and UE 600 of FIG. 6. In various embodiments, device 700 may include a logic circuit 728. The logic circuit 728 may include physical circuits to perform operations described for one or more of UE 102, logic flows 300 and 400, storage medium 500, and UE 600 of FIG. 6 for example. As shown in FIG. 7, device 700 may include a radio interface 710, baseband circuitry 720, and computing platform 730, although the embodiments are not limited to this configuration.

The device 700 may implement some or all of the structure and/or operations for one or more of UE 102, logic flows 300 and 400, storage medium 500, UE 600 of FIG. 6, and logic circuit 728 in a single computing entity, such as entirely within a single device. Alternatively, the device 700 may distribute portions of the structure and/or operations for one or more of UE 102, logic flows 300 and 400, storage medium 500, UE 600 of FIG. 6, and logic circuit 728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 710 may include, for example, a receiver 712, a frequency synthesizer 714, and/or a transmitter 716. Radio interface 710 may include bias controls, a crystal oscillator and/or one or more antennas 718-*f*. In another embodiment, radio interface 710 may use external voltage-controlled oscillators (VCOs), surface acoustic wave filters, intermediate frequency (IF) filters and/or RF filters, as desired. Due to the variety of potential RF interface designs, an expansive description thereof is omitted.

Baseband circuitry 720 may communicate with radio interface 710 to process receive and/or transmit signals and may include, for example, a mixer for down-converting received RF signals, an analog-to-digital converter 722 for converting analog signals to digital form, a digital-to-analog converter 724 for converting digital signals to analog form, and a mixer for up-converting signals for transmission. Further, baseband circuitry 720 may include a baseband or physical layer (PHY) processing circuit 726 for PHY link layer processing of respective receive/transmit signals. Baseband circuitry 720 may include, for example, a medium access control (MAC) processing circuit 727 for MAC/data link layer processing. Baseband circuitry 720 may include a memory controller 732 for communicating with MAC processing circuit 727 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames. Alternatively or in addition, MAC processing circuit 727 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for one or more of UE 102, logic flows 300 and 400, storage medium 500, UE 600 of FIG. 6, and logic circuit 728 using the processing component 740. The processing component 740 (and/or PHY 726 and/or MAC 727) may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chipsets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired.

Embodiments of device 700 may be implemented using single input single output (SISO) architectures. However, certain implementations may include multiple antennas (e.g., antennas 718-f) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 8 illustrates an embodiment of a broadband wireless access system 800. As shown in FIG. 8, broadband wireless access system 800 may be an internet protocol (IP) type network including an internet 810 type network or the like that is capable of supporting mobile wireless access and/or fixed wireless access to internet 810. In one or more embodiments, broadband wireless access system 800 may include any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 800, radio access networks (RANs) 812 and 818 are capable of coupling with next generation node Bs (gNBs) 814 and 820, respectively, to provide wireless communication between one or more fixed devices 816 and internet 810 and/or between or one or more mobile devices 822 and Internet 810. One example of a fixed device 816 and a mobile device 822 is device 700 of FIG. 7, with the fixed device 816 including a stationary version of device 700 and the mobile device 822 including a mobile version of device 700. RANs 812 and 818 may implement profiles that are capable of defining the mapping of network functions to one or more physical entities on broadband wireless access system 800. gNBs 814 and 820 may include radio equipment to provide RF communication with fixed device 816 and/or mobile device 822, such as described with reference to device 700, and may include, for example, the PHY and MAC layer equipment in compliance with a 3GPP LTE Specification or an IEEE 802.16 Standard. gNBs 814 and 820 may further include an IP backplane to couple to Internet 810 via RANs 812 and 818, respectively, although the scope of the claimed subject matter is not limited in these respects.

Broadband wireless access system 800 may further include a visited core network (CN) 824 and/or a home CN 826, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 824 and/or home CN 826, and the scope of the claimed subject matter is not limited in these respects. Visited CN 824 may be referred to as a visited CN in the case where visited CN 824 is not part of the regular service provider of fixed device 816 or mobile device 822, for example where fixed device 816 or mobile device 822 is roaming away from its respective home CN 826, or where broadband wireless access system 800 is part of the regular service provider of fixed device 816 or mobile device 822 but where broadband wireless access system 800 may be in another location or state that is not the main or home location of fixed device 816 or mobile device 822. The embodiments are not limited in this context.

Fixed device 816 may be located anywhere within range of one or both of gNBs 814 and 820, such as in or near a home or business to provide home or business customer broadband access to Internet 810 via gNBs 814 and 820 and RANs 812 and 818, respectively, and home CN 826. It is worthy of note that although fixed device 816 is generally disposed in a stationary location, it may be moved to different locations as needed. Mobile device 822 may be utilized at one or more locations if mobile device 822 is within range of one or both of gNBs 814 and 820, for example. In accordance with one or more embodiments, operation support system (OSS) 828 may be part of broadband wireless access system 800 to provide management functions for broadband wireless access system 800 and to provide interfaces between functional entities of broadband wireless access system 800. Broadband wireless access system 800 of FIG. 8 is merely one type of wireless network showing a certain number of the components of broadband wireless access system 800, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The detailed disclosure now turns to providing examples that pertain to further embodiments. Examples one through thirty provided below are intended to be exemplary and non-limiting.

In a first example, embodiments may include a system, a device, an apparatus, and so forth including radio resources and baseband circuitry coupled with the radio resources, the baseband circuitry including one or more processors to process a handover command message received from a source next-generation node B (gNB), the handover command message including random-access channel (RACH) configuration information, determine at least one of dedicated RACH resources and common RACH resources to access a target gNB based on the RACH configuration information, and cause, via the radio resources, one or more attempts to access the target gNB utilizing at least one of the dedicated RACH resources and the common RACH resources.

In a second example and furtherance of the first example, embodiments include the baseband circuitry to cause the one or more attempts via the dedicated RACH resources prior to attempting to access the target gNB utilizing the common RACH resources determine that there are no beams above a configured threshold to access the target gNB via the dedicated RACH resources, and cause, via the radio resources, one or more attempts to access the target gNB utilizing the common RACH resources.

In a third example and furtherance of any previous example, embodiments include cause the one or more attempts via the dedicated RACH resources prior to attempting to access the target gNB utilizing the common RACH resources, determine that the one or more attempts to access the target gNB via the dedicated RACH resources failed, and cause, via the radio resources, one or more attempts to access the target gNB utilizing the common RACH resources.

In a fourth example and furtherance of any previous example, embodiments include the baseband circuitry to determine a number of attempts to access the target gNB exceeds an attempt threshold to determine the one or more attempts failed.

In a fifth example and furtherance of any previous example, embodiments include the baseband circuitry to detect an expiration of a timer to determine the one or more attempts to access the target gNB failed.

In a sixth example and furtherance of any previous example, embodiments include the baseband circuitry to cause the one or more attempts via the common resources prior to attempting to access the target gNB utilizing the common RACH resources based on the common resources received from the source gNB first in time determine that the one or more attempts to access the target gNB via the common RACH resources failed, and cause, via the radio resources, one or more attempts to access the target gNB utilizing the dedicated RACH resources.

In a seventh example and furtherance of any previous example, embodiments include the handover command message including a first information element having information to indicate the dedicated RACH resources to access the target gNB and a second IE having information to indicate the common RACH resources to access the target gNB.

In an eighth example and furtherance of any previous example, embodiments include the baseband circuitry to determine a beam of a plurality of beams to utilize to attempt to access the target gNB based at least on one or more measurements and the RACH configuration information, and utilize at least one of the dedicated RACH resources and common RACH resources associated with the beam to attempt to access the target gNB.

In a ninth example and furtherance of any previous example, embodiments include the baseband circuitry to determine at least a partial order of beams to attempt to access the target gNB based on the RACH configuration information.

In a tenth example and furtherance of any previous example, embodiments include the baseband circuitry to determine a remaining order of beams to attempt to access the target gNB based on one or more measurements.

In an eleventh example and furtherance of any previous example, a non-transitory machine-readable medium containing instructions, which when executed by a processor, cause the processor to perform operations, the operations to process a handover command message received from a source next-generation node B (gNB), the handover command message including random-access channel (RACH) configuration information, determine at least one of dedicated RACH resources and common RACH resources to access a target gNB based on the RACH configuration information, and cause, via radio resources, one or more attempts to access the target gNB utilizing at least one of the dedicated RACH resources and the common RACH resources.

In a twelfth example and furtherance of any previous example, a non-transitory machine-readable medium containing instructions, which when executed by a processor, cause the processor to perform operations, the operations to cause the one or more attempts via the dedicated RACH resources prior to attempting to access the target gNB utilizing the common RACH resources, determine that there are no beams above a configured threshold to access the target gNB via the dedicated RACH resources, and cause, via the radio resources, one or more attempts to access the target gNB utilizing the common RACH resources.

In a thirteenth example and furtherance of any previous example, a non-transitory machine-readable medium containing instructions, which when executed by a processor, cause the processor to perform operations, the operations to cause the one or more attempts via the dedicated RACH resources prior to attempting to access the target gNB utilizing the common RACH resources, determine that the one or more attempts to access the target gNB via the dedicated RACH resources failed, and cause, via the radio resources, one or more attempts to access the target gNB utilizing the common RACH resources.

In a fourteenth example and furtherance of any previous example, a non-transitory machine-readable medium containing instructions, which when executed by a processor, cause the processor to perform operations, the operations to determine a number of attempts to access the target gNB exceeds an attempt threshold to determine the one or more attempts failed.

In a fifteenth example and furtherance of any previous example, a non-transitory machine-readable medium containing instructions, which when executed by a processor, cause the processor to perform operations, the operations to detect an expiration of a timer to determine the one or more attempts to access the target gNB failed.

In a sixteenth example and furtherance of any previous example, a non-transitory machine-readable medium containing instructions, which when executed by a processor, cause the processor to perform operations, the operations to cause the one or more attempts via the common resources prior to attempting to access the target gNB utilizing the common RACH resources based on the common resources received from the source gNB first in time, determine that the one or more attempts to access the target gNB via the common RACH resources failed, and cause, via the radio resources, one or more attempts to access the target gNB utilizing the dedicated RACH resources.

In a seventeenth example and furtherance of any previous example, a non-transitory machine-readable medium containing instructions, which when executed by a processor, cause the processor to perform operations, the operations to process the handover command message including a first information element having information to indicate the dedicated RACH resources to access the target gNB and a second IE having information to indicate the common RACH resources to access the target gNB.

In an eighteenth example and furtherance of any previous example, a non-transitory machine-readable medium containing instructions, which when executed by a processor, cause the processor to perform operations, the operations to determine a beam of a plurality of beams to utilize to attempt to access the target gNB based at least on one or more measurements and the RACH configuration information, and utilize at least one of the dedicated RACH resources and common RACH resources associated with the beam to attempt to access the target gNB.

In a nineteenth example and furtherance of any previous example, a non-transitory machine-readable medium containing instructions, which when executed by a processor, cause the processor to perform operations, the operations to determine at least a partial order of beams to attempt to access the target gNB based on the RACH configuration information.

In a twentieth example and furtherance of any previous example, a non-transitory machine-readable medium containing instructions, which when executed by a processor, cause the processor to perform operations, the operations to determine a remaining order of beams to attempt to access the target gNB based on one or more measurements.

In a twenty-first example and furtherance of any previous example, a computer-implemented method including processing a handover command message received from a source next-generation node B (gNB), the handover command message including random-access channel (RACH) configuration information, determining at least one of dedicated RACH resources and common RACH resources to access a target gNB based on the RACH configuration information, and causing, via radio resources, one or more attempts to access the target gNB utilizing at least one of the dedicated RACH resources and the common RACH resources.

In a twenty-second example and furtherance of any previous example, a computer-implemented method including causing the one or more attempts via the dedicated RACH resources prior to attempting to access the target gNB utilizing the common RACH resources, determining that there are no beams above a configured threshold to access the target gNB via the dedicated RACH resources, and causing, via the radio resources, one or more attempts to access the target gNB utilizing the common RACH resources.

In a twenty-third example and furtherance of any previous example, a computer-implemented method including causing the one or more attempts via the dedicated RACH resources prior to attempting to access the target gNB utilizing the common RACH resources, determining that the one or more attempts to access the target gNB via the dedicated RACH resources failed, and causing, via the radio resources, one or more attempts to access the target gNB utilizing the common RACH resources.

In a twenty-fourth example and furtherance of any previous example, a computer-implemented method including determining a number of attempts to access the target gNB exceeds an attempt threshold to determine the one or more attempts failed.

In a twenty-fifth example and furtherance of any previous example, a computer-implemented method including detecting an expiration of a timer to determine the one or more attempts to access the target gNB failed.

In a twenty-sixth example and furtherance of any previous example, a computer-implemented method including causing the one or more attempts via the common resources prior to attempting to access the target gNB utilizing the common RACH resources based on the common resources received from the source gNB first in time, determining that the one or more attempts to access the target gNB via the common RACH resources failed, and causing, via the radio resources, one or more attempts to access the target gNB utilizing the dedicated RACH resources.

In a twenty-seventh example and furtherance of any previous example, a computer-implemented method including processing the handover command message including a first information element having information to indicate the dedicated RACH resources to access the target gNB and a second IE having information to indicate the common RACH resources to access the target gNB.

In a twenty-eighth example and furtherance of any previous example, a computer-implemented method including determining a beam of a plurality of beams to utilize to attempt to access the target gNB based at least on one or more measurements and the RACH configuration information, and utilizing at least one of the dedicated RACH resources and common RACH resources associated with the beam to attempt to access the target gNB.

In a twenty-ninth example and furtherance of any previous example, a computer-implemented method including determining at least a partial order of beams to attempt to access the target gNB based on the RACH configuration information.

In a thirtieth example and furtherance of any previous example, a computer-implemented method including determining a remaining order of beams to attempt to access the target gNB based on one or more measurements.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus of a user equipment, comprising:
   memory;
   baseband circuitry coupled with the memory, the baseband circuitry including one or more processors to:
   process a Handover Command received from a source base station (BS), the Handover Command comprising one or more of a first information element (IE) specifying a set of dedicated random-access channel (RACH) resources and a second IE specifying a set of common RACH resources;
   determine one or more of dedicated RACH resources from the set of dedicated RACH resources and common RACH resources from the set of common RACH resources, based on one or more criterion, to attempt to access a target BS, wherein the one or more criterion is associated with a reception time of the first IE and a reception time of the second IE; and
   cause an attempt to access the target BS utilizing the determined one or more dedicated RACH resources or the common RACH resources.

2. The apparatus of claim 1, wherein the one or more criterion includes a received signal strength indicator (RSSI) threshold associated with the one or more dedicated RACH resources,
   the baseband circuitry to attempt to access the target BS when the RSSI threshold is satisfied; and
   when the RSSI threshold is not satisfied, attempt to access the target BS utilizing the one or more common RACH resources.

3. The apparatus of claim 1, the baseband circuitry to process beam measurement information to include in a measurement report for communication to the source BS.

4. The apparatus of claim 1, wherein the Handover Command comprises beam information indicating one or more beams to utilize to attempt to access the target BS, and the baseband circuitry to process the beam information and determine beams from the one or more beams to utilize to attempt to access the target BS.

5. The apparatus of claim 1, wherein the Handover Command specifies an association between the set of common RACH resources and a synchronization sequence block (SSB).

6. The apparatus of claim 1, wherein the Handover Command specifies an association between the set of dedicate RACH resources and a synchronization sequence block (SSB).

7. The apparatus of claim 1, wherein the Handover Command specifies an association between the set of dedicated RACH resources a channel state information reference signal (CSI-RI).

8. A non-transitory machine-readable medium containing instructions, which when executed by a processor, cause the processor to perform operations, the operations to:
   process a Handover Command received from a source base station (BS), the Handover Command comprising at least one of a first information element (IE) specifying a set of dedicated random-access channel (RACH) resources and/or a second IE specifying a set of common RACH resources;
   determine at least one of dedicated RACH resources from the set of dedicated RACH resources and/or common RACH resources from the set of common RACH resources, based on one or more criterion, to attempt to access a target BS, wherein the one or more criterion is associated with a reception time of the first IE and a reception time of the second IE; and
   cause an attempt to access the target BS utilizing the determined at least one of dedicated RACH resources and/or the common RACH resources.

9. The non-transitory machine-readable medium of claim 8, wherein the one or more criterion includes a received signal strength indicator (RSSI) threshold associated with the one or more dedicated RACH resources,
   wherein the operations further comprise operations to attempt to access the target BS when the RSSI threshold is satisfied; and
   when the RSSI threshold is not satisfied, attempt to access the target BS utilizing the one or more common RACH resources.

10. The non-transitory machine-readable medium of claim 8, wherein the operations further comprise operations to process beam measurement information to include in a measurement report for communication to the source BS.

11. The non-transitory machine-readable medium of claim 8, wherein the Handover Command comprises beam information indicating one or more beams to utilize to attempt to access the target BS, and the operations to process the beam information to utilize to attempt to access the target BS the beam information and determine beams from the one or more beams to utilize to attempt to access the target BS.

12. The non-transitory machine-readable medium of claim 8, wherein the Handover Command specifies an association between the set of common RACH resources and a synchronization sequence block (SSB).

13. The non-transitory machine-readable medium of claim 8, wherein the Handover Command specifies an association between the set of dedicate RACH resources and a synchronization sequence block (SSB).

14. The non-transitory machine-readable medium of claim 8, wherein the Handover Command specifies an association between the set of dedicated RACH resources a channel state information reference signal (CSI-RI).

15. A baseband processor of a user equipment (UE), comprising:
one or more processors configured to:
process a Handover Command received from a source base station (BS), the Handover Command comprising one or more of a first information element (IE) specifying a set of dedicated random-access channel (RACH) resources and a second IE specifying a set of common RACH resources;
determine one or more of dedicated RACH resources from the set of dedicated RACH resources and common RACH resources from the set of common RACH resources, based on one or more criterion, to attempt to access a target BS;
cause an attempt to access the target BS utilizing the determined one or more dedicated RACH resources or the common RACH resources;
wherein the one or more criterion includes a received signal strength indicator (RSSI) threshold associated with the one or more dedicated RACH resources,
further configured to attempt to access the target BS when the RSSI threshold is satisfied; and
when the RSSI threshold is not satisfied, attempt to access the target BS utilizing the one or more common RACH resources.

16. The baseband processor of claim 15, wherein the one or more criterion is associated with a reception time of the first IE and a reception time of the second IE.

17. The baseband processor of claim 15, comprising processing beam measurement information to include in a measurement report for communication to the source BS.

18. The baseband processor of claim 15, wherein the Handover Command comprises beam information indicating one or more beams to utilize to attempt to access the target BS, and further configured to process the beam information and determining beams from the one or more beams to utilize to attempt to access the target BS.

19. The baseband processor of claim 15, wherein the Handover Command specifies an association between the set of common RACH resources and a synchronization sequence block (SSB).

20. The baseband processor of claim 15, wherein the Handover Command specifies an association between the set of dedicate RACH resources and a synchronization sequence block (SSB).

21. The baseband processor of claim 15, wherein the Handover Command specifies an association between the set of dedicated RACH resources a channel state information reference signal (CSI-RI).

* * * * *